US 9,253,655 B2

United States Patent
Hu et al.

(10) Patent No.: US 9,253,655 B2
(45) Date of Patent: Feb. 2, 2016

(54) LOW LATENCY CHANNEL ESTIMATION FOR DOWNLINK MIMO

(75) Inventors: Yang Hu, Beijing (CN); Elias Jonsson, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 585 days.

(21) Appl. No.: 13/703,410

(22) PCT Filed: Jul. 14, 2010

(86) PCT No.: PCT/CN2010/001054
§ 371 (c)(1),
(2), (4) Date: Dec. 11, 2012

(87) PCT Pub. No.: WO2011/156940
PCT Pub. Date: Dec. 22, 2011

(65) Prior Publication Data
US 2013/0107694 A1 May 2, 2013

(30) Foreign Application Priority Data
Jun. 16, 2010 (WO) ................ PCT/CN2010/000865

(51) Int. Cl.
*H04W 24/02* (2009.01)
*H04J 13/00* (2011.01)
(Continued)

(52) U.S. Cl.
CPC .......... *H04W 24/02* (2013.01); *H04J 13/0003* (2013.01); *H04J 13/004* (2013.01); *H04J 13/0048* (2013.01); *H04J 13/18* (2013.01); *H04L 5/0051* (2013.01); *H04L 25/022* (2013.01); *H04L 25/0224* (2013.01); *H04L 25/0232* (2013.01); *H04L 27/262* (2013.01); *H04L 27/2613* (2013.01); *H04L 5/0016* (2013.01); *H04W 48/08* (2013.01); *H04W 72/042* (2013.01)

(58) Field of Classification Search
CPC .... H04L 5/026; H04W 24/02; H04J 13/0003; H04J 13/004; H04J 13/18
See application file for complete search history.

(56) References Cited

U.S. PATENT DOCUMENTS 6,314,131 B1  11/2001  Roe et al.
6,665,288 B1  12/2003  Ottosson et al.
(Continued)

FOREIGN PATENT DOCUMENTS

CN    1387708 A   12/2002
CN    1839602 A    9/2006

OTHER PUBLICATIONS

U.S. Appl. No. 61/296,389 and U.S. Appl. No. 61/320,331.*
(Continued)

*Primary Examiner* — Xavier S. Wong
(74) *Attorney, Agent, or Firm* — Coats & Bennett, P.L.L.C.

(57) ABSTRACT

When more than two layers are multiplexed in one CDM group, length-4 OCC has to be used across both clusters in one subframe. This means that slot-by-slot channel estimation according to conventional schemes cannot be exploited and Doppler impact cannot be well overcome. By introducing virtual variables and virtual channel samples that are used in processing two time slots in a subframe independently and applying a frequency domain filter based on the virtual variables and then performing postprocessing based on virtual channel samples, slot-by-slot processing is possible to reduce latency and overcome Doppler impact. Code de-spreading of length-4 OCC is no longer processed in time domain, but in frequency domain with two adjacent CDM subgroups. As a result, the frequency domain filtering can start earlier whereby detection latency and processing time for OCC of length longer than 2 is reduced. It can also be used for the length-2 OCC.

18 Claims, 8 Drawing Sheets

(51) Int. Cl.
    *H04J 13/18*     (2011.01)
    *H04L 25/02*     (2006.01)
    *H04L 27/26*     (2006.01)
    *H04L 5/00*      (2006.01)
    *H04W 48/08*         (2009.01)
    *H04W 72/04*         (2009.01)

(56) References Cited

U.S. PATENT DOCUMENTS

| 7,606,334 | B2 |    | 10/2009 | D'Amico et al. |         |
|-----------|----|----|---------|----------------|---------|
| 8,780,832 | B2 | *  | 7/2014  | Hu et al.      | 370/329 |

| 2002/0021686 | A1 | * | 2/2002  | Ozluturk  | G06F 13/374 |
|--------------|----|---|---------|-----------|-------------|
|              |    |   |         |           | 370/342     |
| 2002/0075821 | A1 | * | 6/2002  | Gerakoulis| H04B 1/707  |
|              |    |   |         |           | 370/320     |
| 2010/0002800 | A1 |   | 1/2010  | Kim et al.|             |
| 2012/0300728 | A1 | * | 11/2012 | Lee et al.| 370/329     |
| 2013/0070732 | A1 | * | 3/2013  | Noh et al.| 370/335     |

OTHER PUBLICATIONS

Huawei, "OCC mapping scheme for downlink DMRS," 3GPP TSG RAN WG1 meeting #61, Agenda Item 6.3.1.3, R1-103098 OCC Mapping Scheme for Downlink DMRS 1.0, Montreal, Canada, May 10-14, 2010, pp. 1-6.

* cited by examiner

LOW LATENCY CHANNEL ESTIMATION FOR DOWNLINK MIMO

TECHNICAL FIELD

This invention relates generally to low latency channel estimation methods, apparatuses and systems for downlink multiple input, multiple output (MIMO) where a high-order MIMO can be applied to support multiple layer transmission.

BACKGROUND

The 3rd Generation Partnership Project (3GPP) is responsible for standardization of the Universal Mobile Telecommunication Service (UMTS) system and Long Term Evolution (LTE). LTE is a technology for realizing high-speed packet-based communication that can reach high data rates both in the downlink and in the uplink directions, and is thought of as a next generation mobile communication system of the UMTS system. The 3GPP work on LTE is also referred to as Evolved Universal Terrestrial Access Network (E-UTRAN). The first release of LTE, also referred to as 3GPP Release 8 or Rel-8 can provide peak rates of 300 Mbps, a radio-network delay of 5 ms or less, a significant increase in spectrum efficiency and a network architecture designed to simplify network operation and reduce cost. To support such high data rates, LTE allows for a system bandwidth of up to 20 MHz. LTE is also able to operate in different frequency bands and can operate in at least Frequency Division Duplex (FDD) and Time Division Duplex (TDD). The modulation technique or the transmission scheme used in LTE is known as Orthogonal Frequency Division Multiplexing (OFDM).

For the next generation mobile communications system such as International Mobile Telecommunications (IMT)-Advanced and/or LTE-Advanced, which is an evolution of LTE, support for bandwidths of up to 100 MHz is being discussed. LTE-Advanced can be viewed as a future release of the LTE standard and since it is an evolution of LTE, backward compatibility is important so that LTE-Advanced can be deployed in spectrum already occupied by LTE. In both LTE and LTE-Advanced radio base stations, also referred to as eNBs or eNodeBs, multiple antennas with precoding/beamforming technology can be adopted to provide high data rates to the user equipments (UEs). Thus, LTE and LTE-Advanced (LTE-A) are examples of Multiple-Input, Multiple-Output (MIMO) radio systems. Another example of a MIMO based system is the Worldwide Interoperability for Microwave Access (WiMAX) system.

In LTE-A, also referred to as 3GPP Release 10 or Rel-10, up to 8 UE-specific reference signals, also referred to as demodulation reference signals (DM-RS), are introduced for the purpose of channel demodulation. A reference signal is a known signal which is inserted at predetermined positions in the OFDM time-frequency grid. The presence of this known signal allows the UE to estimate the downlink channel so that it may carry out coherent channel demodulation. Thus, each downlink antenna port transmits one DM-RS, which is specific to that antenna port as well as to the UE that the transmission is directed to. Thus far, the DM-RS pattern with normal cyclic prefix (CP) supporting up to rank 8 has been specified. A cyclic prefix is a guard interval which is prepended to each OFDM symbol to reduce inter-symbol interference.

The DM-RS signals are transmitted according to a predefined pattern in time and frequency, so that the UE knows where to find the signals. FIG. 1 shows a DM-RS pattern with normal cyclic prefix (CP), supporting up to rank 8. The expression "rank", or transmission rank, refers to the number of independent data streams, or spatial layers, which may be reliably transmitted over a wireless channel. In the present context, the rank may be interpreted as the maximum number of transmit antenna ports that are supported.

A brief review of the LTE downlink physical resource structure will be helpful. In OFDM systems such as the LTE, the available physical resources are divided into a time and frequency grid. The time is divided into subframes, each comprising a number of OFDM symbols. In LTE and LTE Advanced, a subframe is 1 ms in length, divided into two time slots of 0.5 ms each. For normal cyclic prefix (CP) length, the number of OFDM symbols per subframe is 14, which means that time is quantized into 14 symbols during a subframe. For extended cyclic prefix length, there are 12 OFDM symbols per subframe. Frequency corresponds to subcarriers in the OFDM symbols, and the number of subcarriers varies depending on the system bandwidth used. Each box within the time-frequency grid represents a single subcarrier for one symbol period, and is referred to as a resource element (RE). The smallest schedulable unit of resource elements is called a physical resource block (PRB), or simply a resource block (RB). In LTE and LTE-A, a PRB spans 12 subcarriers and 0.5 ms, i.e. 7 or 6 OFDM symbols depending on cyclic prefix length. The PRBs are allocated in pairs in the time domain. Thus, an LTE subframe of 1 ms comprises two PRBs.

There is also a special type of LTE subframe, composed of three fields: Downlink Pilot Timeslot (DwPTS), Guard Period (GP), and Uplink Pilot Timeslot (UpPTS). This special subframe is used for downlink-to-uplink switching in TDD mode. The duration of the GP field is varied depending on how long it takes the UE to switch between receiving and sending, and also on the signal propagation time from the base station to the UE. The DwPTS field carries synchronization and user data, as well as the downlink control channel for transmitting scheduling and control information. Since the total subframe duration is fixed at 1 ms, the duration of the DwPTS and UpPTS fields are adjusted based on the duration of the GP field.

FIG. 1 shows a time-frequency grid for a normal LTE subframe. Each row in the grid represents a subcarrier, and each column represents an OFDM symbol. The grid covers two LTE time slots, as explained above. The DM-RS pattern of FIG. 1 supports a total of 8 DM-RS antenna ports. The pattern exhibits a DM-RS overhead of 12 REs per layer; that is, each antenna port will use 12 REs for transmitting the DM-RS signals. The 8 DM-RS antenna ports are separated by a combination of code division multiplexing (CDM) and frequency division multiplexing (FDM). It should be noted that the term "antenna port" is used rather than "antenna", to emphasize that what is referred to does not necessarily correspond to a single physical antenna.

Up to two CDM groups are reserved for DM-RS, where each CDM group consists of 12 REs per PRB pair. A CDM group is a group of REs used for multiplexing reference signals from a number of antenna ports using code division multiplexing. In FIG. 1, the squares marked "1" form one CDM group, and the squares marked "2" form another CDM group. Each CDM group supports a maximum of four layers, i.e. a maximum of four antenna ports. The two CDM groups are multiplexed by FDM; in other words, the REs belonging to the first and second CDM groups are transmitted on different subcarriers.

As seen, there are two CDM clusters, one in each time slot. Furthermore, each CDM group comprises three CDM subgroups. Each CDM subgroup comprises 4 REs in the time domain, and in each CDM subgroup, up to four DM-RS antenna ports may be multiplexed. The REs within each subgroup share the same subcarrier in the frequency domain. For example, the four squares marked "1" in the top row of the time-frequency grid in FIG. 1 form one CDM subgroup of the CDM group 1. The REs of the subgroup being on the same row indicates that they are carried by the same subcarrier. It is also seen that different CDM subgroups are on different rows in the figure indicating that the REs of different CDM subgroups are carried on different subcarriers.

The multiplexing of reference signals within a CDM subgroup is accomplished by applying orthogonal cover codes (OCC) across the time domain. An OCC is a set of codes where all codes in the set have zero cross-correlation. Thus, two signals encoded with two different codes from the set will not interfere with one another. An example of an OCC is a Walsh code. Walsh codes are defined using a Walsh matrix of length N, i.e. having N columns. Each row in the Walsh matrix is one length-N Walsh code. Although Walsh codes will be used in this disclosure to exemplify the invention, it should be understood that any OCC may be used.

Each antenna port transmits one reference signal within the CDM subgroup, by applying an OCC to the signal. If four antenna ports are multiplexed within a CDM subgroup, each of the four antenna ports applies a code of the OCC corresponding to the CDM subgroup. As a way of an explanation, the following is example provided. A length-4 OCC for a CDM subgroup may be visualized as a 4×4 matrix with each row of the matrix representing a code of the OCC applied by a corresponding antenna port. This allows the reference signals to be separated and decoded on the receiver side. Note that for each CDM group, a different 4×4 matrix is used.

At the UE side, per port channel estimation is performed by using the proper OCC for each of the CDM subgroups. That is, each DM-RS signal is decoded using the corresponding OCC that was used to encode the signal. A different length OCC is applied for channel estimation depending on how many layers are multiplexed in one CDM group. Two exemplary cases with two and four layers, respectively, will now be described with reference to FIGS. 2 and 3.

When two layers are multiplexed in one CDM group, a length-2 OCC can be used for the CDM cluster in the first and second time slots respectively, as shown in FIG. 2. This means that the Doppler impact introduced by mobility can be well captured by weighting the two CDM clusters. When the mobility of the UE is high, the time domain channel is likely to vary fast in time. This means that the channel is likely to vary between the first and second time slots in the subframe. Since applying the length-2 OCC means that code spreading is processed in each time slot, the Doppler impact between two slots can be well compensated for by weighting the two slots with proper coefficients that reflect realistic channel conditions.

When more than two layers are multiplexed in one CDM group, a length-4 OCC has to be used across both CDM clusters in one subframe, as illustrated in FIG. 3. Length-4 OCC is typically used for high rank cases. At the UE side, one common strategy for performing DM-RS based channel estimation is to apply a 2×1D filter method per PRB, i.e. first a frequency domain filter and then a time domain filter. The basic principle is shown in FIG. 4. Frequency domain filtering and time domain filtering are performed based on respective inputs of delay spread, Doppler, and received signals. In general, applying the frequency domain filter has been found to be very processing intensive and thus requires a much longer processing time than the time domain filter. Thus, to a significant extent, the time required by the frequency domain filter becomes a bottleneck to speed up the processing on channel estimation and further detection, and this may impact overall detection latency.

When performing channel estimation with a length-2 OCC, as shown in FIG. 2, a slot-by-slot channel estimation can be exploited. In other words, channel estimation based on the signals received in the first slot can be performed before the reception of the whole subframe. The reason for this is that a reference signal is transmitted in two consecutive REs, which are in the same time slot, and all the information required to decode the reference signal is available within that single time slot. This allows the processing required by the frequency domain filter in the first time slot to be commenced before the reference signals in the second time slot are received. This can result in a low latency channel estimator.

However, in Rel-10, a length-4 OCC is used to support multiplexing of up to four layers in each CDM group, as explained above. When performing channel estimation with the length-4 OCC as shown in FIG. 3, the code de-spreading cannot be performed until the whole subframe is received. This is because the reference signal is spread across four REs, which are distributed across two time slots. Thus, in the conventional scheme, channel estimation cannot be performed until signals in both time slots are received. In other words, processing of the first time slot signals cannot commence until immediately after receiving the signals. Thus, additional time will be required, particularly by the frequency domain filter. Consequently, a low latency channel estimator is not suitable for the length-4 OCC for the conventional scheme. In addition, in case of the length-4 OCC, the Doppler impact cannot be well compensated since code de-spreading needs to be considered in both time slots.

SUMMARY

The present invention addresses many issues of conventional channel estimation including the problems described above. A non-limiting aspect of the disclosed subject matter is directed to a method for decoding a reference signal which is received in a code division multiplexing, CDM, group, in which the CDM group includes at least two CDM subgroups. Each CDM subgroup is received on a different subcarrier, and each CDM subgroup includes resource elements in a first time slot and a subsequent second time slot. In the method, a first set of resource elements for each of the at least two CDM subgroups are received in a first time slot at a user equipment. The user equipment may determine virtual variables, which may also be referred to as temporary or intermediate variables, of the first time slot by applying orthogonal cover codes applicable in the first time slot to the corresponding first set of resource elements of each of the at least two CDM subgroups. The user equipment may then determine virtual channel samples, which may also be referred to as temporary or intermediate channel samples, of the first time slot by or based on applying a predetermined weighting matrix to the virtual variables of the first time slot. The method also includes receiving, at the user equipment, a second set of resource elements for each of the at least two CDM subgroups in a second time slot, determining virtual, or temporary or intermediate, variables of the second time slot by applying orthogonal cover codes applicable in the second time slot to the corresponding second set of resource elements of each of the at least two CDM subgroups, and determining the virtual, or temporary or intermediate, channel samples of the second time slot by or based on applying the predetermined weighting matrix to the virtual variables of the second time slot. The user equipment may then determine the channel estimates of the at least two CDM subgroups based on the virtual variables of both the first and second time slots.

Another non-limiting aspect of the disclosed subject matter is directed to a user equipment adapted to decode a reference signal which is received in a code division multiplexing, CDM, group, in which the CDM group includes at least two CDM subgroups. Each CDM subgroup is received on a different subcarrier, and each CDM subgroup includes resource elements in a first time slot and a subsequent second time slot. The user equipment may comprise a communication unit, a signal processing unit, a frequency domain filter unit, and a time domain filter unit. The communication unit may be arranged to receive a first set of resource elements for each of the at least two CDM subgroups in the first time slot and arranged to receive a second set of resource elements for each of the at least two CDM subgroups in the second time slot. The signal processing unit may be arranged to determine the virtual variables of the first time slot by applying orthogonal cover codes applicable in the first time slot to the corresponding first set of resource elements of each of the at least two CDM subgroups and arranged to determine virtual variables of the second time slot by applying orthogonal cover codes applicable in the second time slot to the corresponding second set of resource elements of each of the at least two CDM subgroups. The frequency domain filter unit may be arranged to determine virtual channel samples of the first time slot by applying a predetermined weighting matrix to the virtual variables of the first time slot and arranged to determine virtual channel samples of the second time slot by applying the predetermined weighting matrix to the virtual variables of the second time slot. The time domain filter unit may be arranged to determine channel estimates of the at least two CDM subgroups based on the virtual channel samples of both the first and second time slots.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale.

DETAILED DESCRIPTION

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure:

Thus, for example, it will be appreciated that block diagrams herein can represent conceptual views of illustrative circuitry embodying principles of the technology. Similarly, it will be appreciated that any flow charts, state transition diagrams, pseudocode, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

The disclosed subject matter is described primarily using the 3GPP LTE in the exemplary embodiments. However, it should be noted that the principles of the discussed subject matter is widely applicable to other MIMO based communication systems such as WiMAX, WCDMA or any other MIMO based system utilizing a CDM based reference signal structure.

Figure 4:
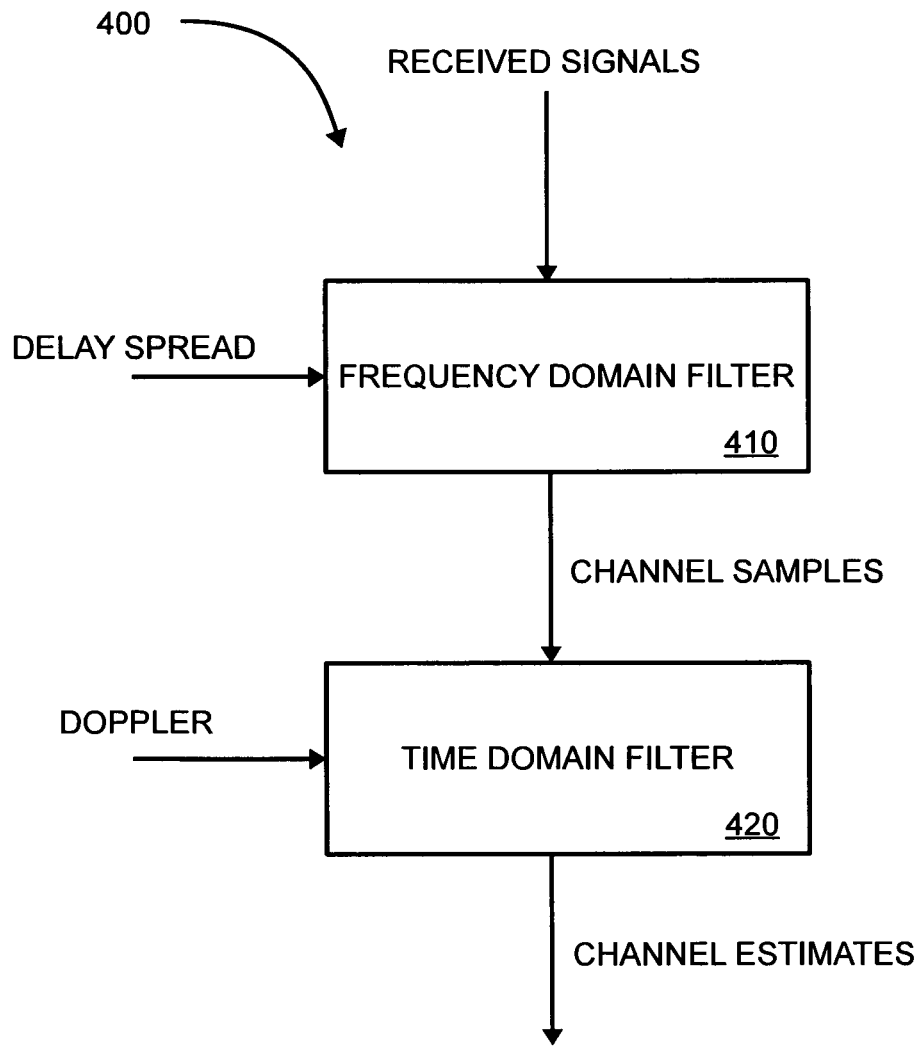
FIG. 4 illustrates a principle of a 2×1D filter channel demodulation algorithm.

To provide an accurate channel estimation needed for coherent demodulation of transmitted symbols and to uphold low latency can be conflicting goals. Conventionally, at the UE side, one common strategy in DM-RS based channel estimation is to apply a 2×1D filter method per PRB, i.e. to first apply a frequency domain filter and then apply a time domain filter as mentioned above and illustrated in FIG. 4.

Figure 2:
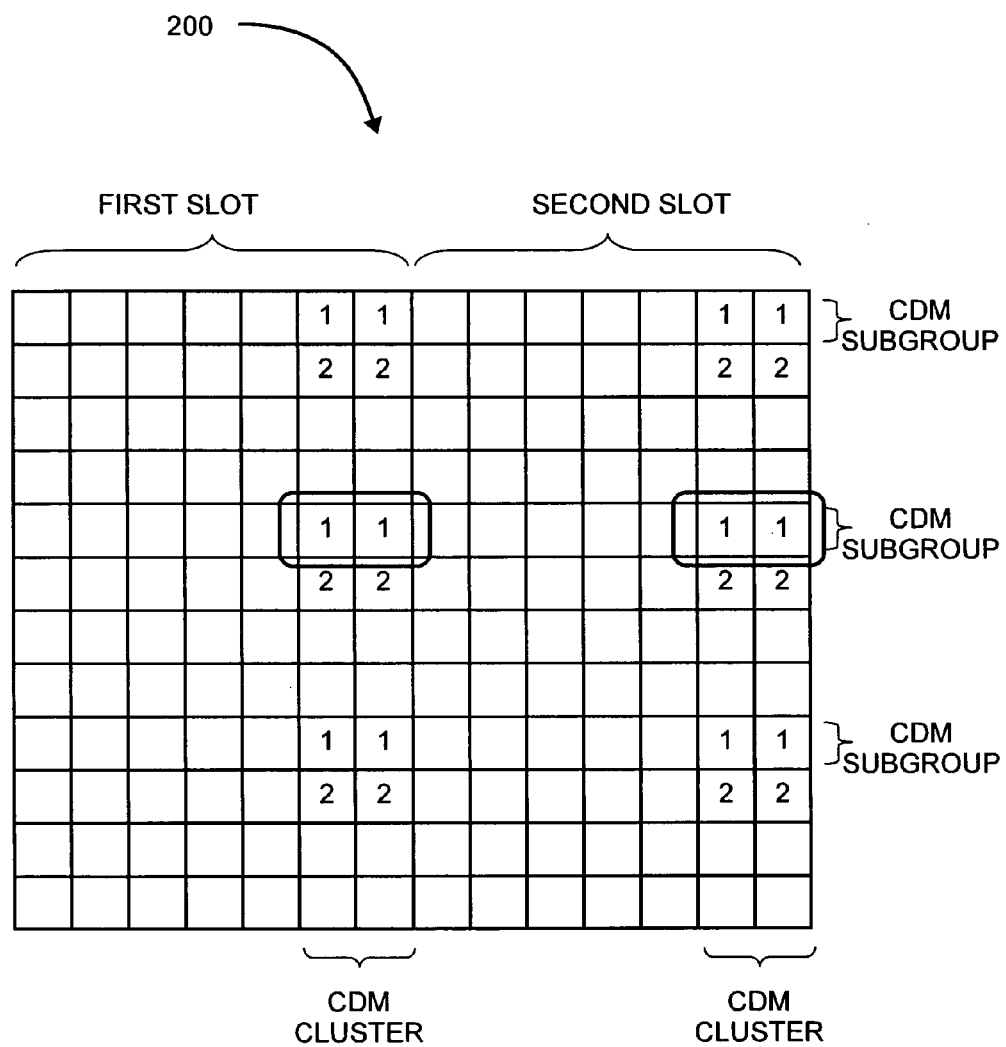
FIGS. 2 and 3 illustrate applications of length-2 and length-4 orthogonal cover code for conventional channel estimation.

Also as mentioned above and referring back to FIG. 2, when performing the channel estimation with the length-2 OCC, slot-by-slot channel estimation can be exploited to reduce the latency. In the slot-by-slot channel estimation, the channel estimation in the first slot can be performed before the reception of the whole subframe. The processing by the frequency domain filter for filtering the signal received in the first time slot can be finalized earlier since it can be processed while receiving the signal that is transmitted in the second time slot. This can result in a low latency channel estimator.

Figure 3:
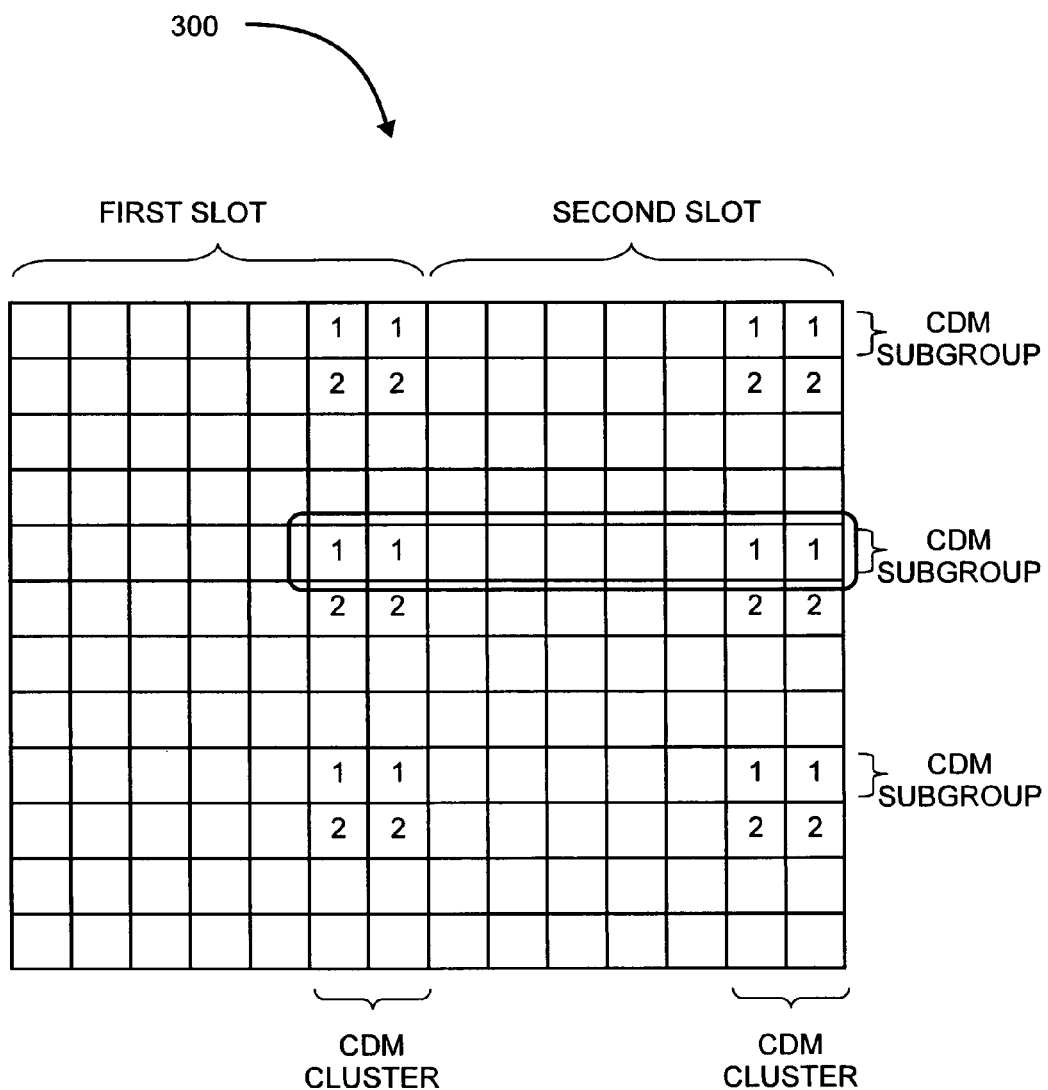

However, when it comes to channel estimation with length-4 OCC as illustrated in FIG. 3, such slot-by-slot low latency channel estimation cannot be performed. The difference is that the length-4 code de-spreading needs to wait until the whole subframe is received. Thus in the conventional scheme, both first and second time slots must be received before performing the channel estimation.

Figure 1:
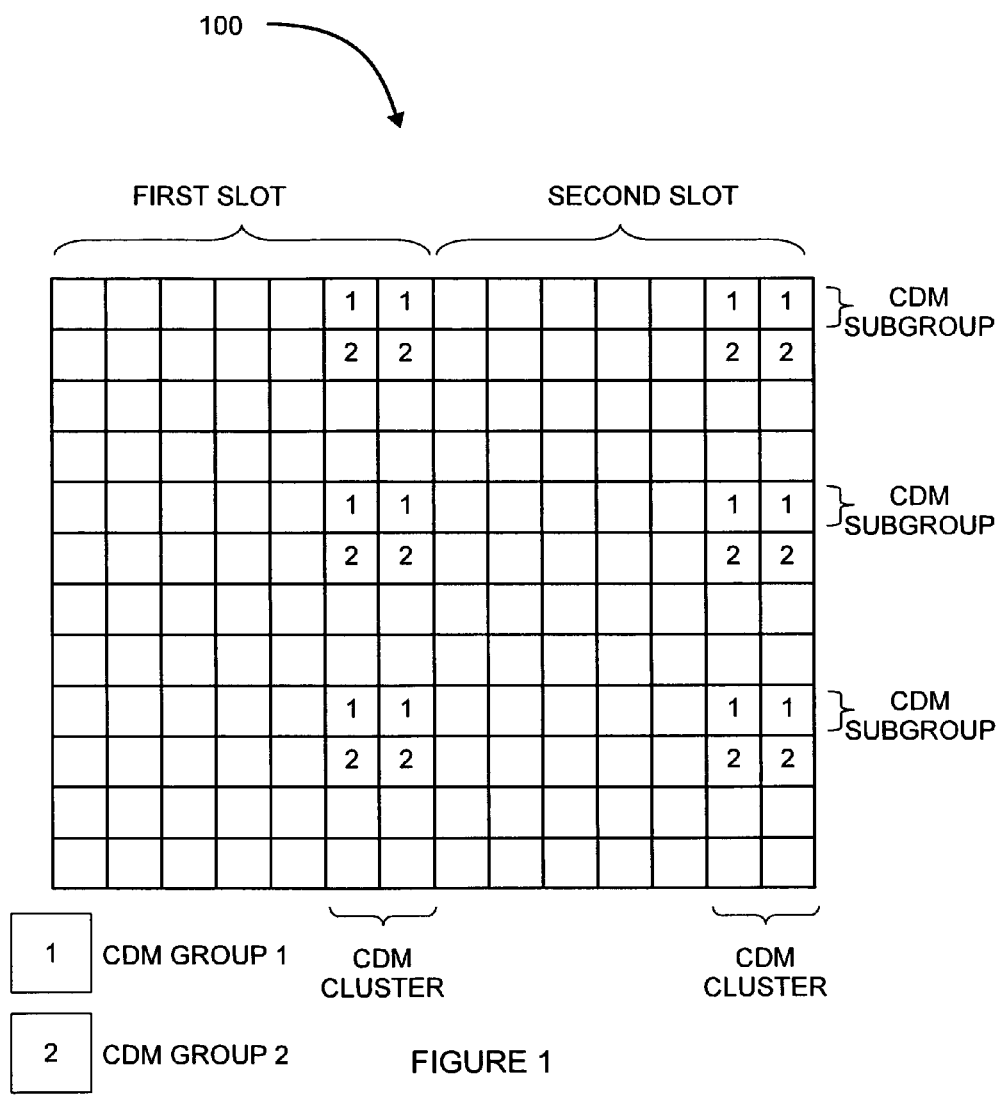
FIG. 1 illustrates a demodulation reference signal pattern with normal cyclic prefix in a subframe of an OFDM physical resource structure.

The conventional scheme as applied to an example of four layers in one CDM group for the LTE-advanced is described in detail. Referring back to FIG. 1, it is seen that each CDM group includes three CDM subgroups per PRB. As illustrated in FIG. 3, when the length of the OCC is 4, the OCC spans both the first and the second time slots of the subframe. In this instance, for the n-th CDM sub-group, where n=1, 2, 3 respectively, the system model can be written as follows:

$$\begin{bmatrix} Y_{n,1} \\ Y_{n,2} \\ Y_{n,3} \\ Y_{n,4} \end{bmatrix} = \begin{bmatrix} W_{n,1} & W_{n,2} & W_{n,3} & W_{n,4} \\ W_{n,1} & -W_{n,2} & W_{n,3} & -W_{n,4} \\ W_{n,1} & W_{n,2} & -W_{n,3} & -W_{n,4} \\ W_{n,1} & -W_{n,2} & -W_{n,3} & W_{n,4} \end{bmatrix} \cdot \begin{bmatrix} s_{n,1} \\ s_{n,2} \\ s_{n,3} \\ s_{n,4} \end{bmatrix} \quad [1]$$

In the matrix equation (1), $s_{n,i}$ is the transmitted reference signal of the i-th layer, i.e. the signal of the i-th antenna port. Each $s_{n,i}$ can be a quadrature phase shift keying (QPSK) symbol. For simplification, each $s_{n,i}$ is assumed to be 1 in this context. Each $W_{n,i}$ represents the channel fading coefficient of the i-th layer, which is estimated at the UE side. Further, each $Y_{n,j}$ is the received signal at the UE side of j-th RE in n-th CDM subgroup. Here, length-4 Walsh Codes is used to multiplex the four layers.

As noted, when the length of the OCC spans multiple time slots, the conventional scheme starts the channel estimation only when all slots are received. For example, in the length-4 OCC case, the channel estimation process commences only when the signals in both the first and second slots are received, and the code de-spreading of the length-4 OCC are processed as follows for the n-th CDM sub-group:

$$\begin{bmatrix} \hat{W}_{n,1} \\ \hat{W}_{n,2} \\ \hat{W}_{n,3} \\ \hat{W}_{n,4} \end{bmatrix} = \begin{bmatrix} Y_{n,1} & Y_{n,2} & Y_{n,3} & Y_{n,4} \\ Y_{n,1} & -Y_{n,2} & Y_{n,3} & -Y_{n,4} \\ Y_{n,1} & Y_{n,2} & -Y_{n,3} & -Y_{n,4} \\ Y_{n,1} & -Y_{n,2} & -Y_{n,3} & Y_{n,4} \end{bmatrix} \cdot \begin{bmatrix} 1/4 \\ 1/4 \\ 1/4 \\ 1/4 \end{bmatrix} \quad (2)$$

In equation (2), each $\hat{W}_{n,i}$ represents an estimation of the corresponding channel coefficient of $W_{n,i}$. It is seen that to determine each of $\hat{W}_{n,i}$, all signals $Y_{n,j}$, j=1, 2, 3, 4 must be received. As such, the channel estimation processing cannot be performed until the second time slot is also received.

After all $Y_{n,j}$ signals are received, the frequency channel samples then can be obtained after adopting a frequency domain filter using a weighting matrix G as follows:

$$\hat{H}_1 = G \cdot \begin{bmatrix} \hat{W}_{1,1} \\ \hat{W}_{2,1} \\ \hat{W}_{3,1} \end{bmatrix}, \hat{H}_2 = G \cdot \begin{bmatrix} \hat{W}_{1,2} \\ \hat{W}_{2,2} \\ \hat{W}_{3,2} \end{bmatrix}, \quad (3)$$

$$\hat{H}_3 = G \cdot \begin{bmatrix} \hat{W}_{1,3} \\ \hat{W}_{2,3} \\ \hat{W}_{3,3} \end{bmatrix}, \hat{H}_4 = G \cdot \begin{bmatrix} \hat{W}_{1,4} \\ \hat{W}_{2,4} \\ \hat{W}_{3,4} \end{bmatrix},$$

In equation (3), G is an N×3 matrix where N is typically a number between 8 and 15. G is a matrix with weighting coefficients in frequency domain, which is determined by delay spread inputs. For example, G may be a 12×3 weighting matrix in case of per-PRB processing. Each $\hat{H}_i$ is the channel estimate of the i-th layer in the frequency domain.

With the conventional scheme, the latency is likely to be longer since the channel estimation cannot be performed on a slot-by-slot basis for OCC codes that span multiple time slots. Thus, it is inevitable that extra time will be taken, in particular by the frequency domain filter. As a result, in the conventional solution, a low latency channel estimator is not suitable to the length-4 OCC case since slot-by-slot channel estimation cannot be maintained.

In addition, in case of the length-4 OCC, the Doppler impact is not reflected in the conventional scheme since the length-4 code de-spreading needs to be processed across two CDM clusters. In the conventional method, code spreading across time domain assumes flat channel in time domain. However, the Doppler impact introduced by high mobility means that the assumption about a flat channel in time domain will not be valid. This means that code orthogonality in time domain will not hold. Furthermore, the Doppler impact cannot be reflected or compensated for in the channel estimation.

One or more aspects of the disclosed subject matter address these and other shortcomings of the conventional channel estimation techniques. According to one or more embodiments of the invention, code de-spreading may be performed in each time slot, and then the weighting between two time slots can reflect or compensate for the varying channel in the time domain. In one aspect, apparatuses, systems, and/or methods are provided in which a slot-by-slot channel estimation can be performed for received signals that are encoded with OCC that spans over multiple time slots. Additionally, the Doppler impact can be efficiently overcome. The disclosed apparatuses, systems, and/or methods can also be applied to received signals that are encoded with OCC that does not span multiple time slots.

In one non-limiting aspect, a low latency channel estimator is proposed by slot-by-slot processing for received signals that are encoded with OCC that spans multiple time slots. Going back to the length-4 OCC received over the first and second time slots in the LTE-advanced DM-RS pattern illustrated in FIG. 1, slot-by-slot processing can be implemented using the method 500 illustrated in FIG. 5. In this figure, it is assumed that the UE receives the reference signals of different time slots transmitted from the base station.

In step 510, virtual variables for a time slot are determined after receiving the signals of the time slot. The signals $Y_{n,j}$ received in the two time slots can be processed independently as described below. By setting $\hat{A}_{n,i} = +\hat{W}_{n,i} + \hat{W}_{n,i+2}$ for i=1 and 2, and $\hat{A}_{n,i} = \hat{W}_{n,i-2} - \hat{W}_{n,i}$ for i=3 and 4, and then applying equation (2), the following equations are achieved:

$$1^{st} \text{ slot } \begin{bmatrix} \hat{A}_{n,1} \\ \hat{A}_{n,2} \end{bmatrix} = \begin{bmatrix} Y_{n,1} & Y_{n,2} \\ Y_{n,1} & -Y_{n,2} \end{bmatrix} \cdot \begin{bmatrix} \frac{1}{2} \\ \frac{1}{2} \end{bmatrix} \quad (4a)$$

$$2^{nd} \text{ slot } \begin{bmatrix} \hat{A}_{n,3} \\ \hat{A}_{n,4} \end{bmatrix} = \begin{bmatrix} Y_{n,3} & Y_{n,4} \\ Y_{n,3} & -Y_{n,4} \end{bmatrix} \cdot \begin{bmatrix} \frac{1}{2} \\ \frac{1}{2} \end{bmatrix} \quad (4b)$$

In equations (4a) and (4b), each $\hat{A}_{n,i}$ is a 'virtual' variable of the i-th layer of the n-th CDM subgroup. Each virtual variable may be viewed as partial code de-spreading using a part the OCC of the CDM subgroup. Recall that each $Y_{n,j}$ is the received signal of j-th RE of the n-th CDM subgroup. As seen, the virtual variables $\hat{A}_{n,1}$ and $\hat{A}_{n,2}$ in equation (4a) can be determined solely based on the signals $Y_{n,1}$ and $Y_{n,2}$ received during the first slot. For example, for the first CDM subgroup, i.e., n=1, the first time slot virtual variables $$\hat{A}_{1,1} = \frac{1}{2}(Y_{1,1} + Y_{1,2}) \text{ and } \hat{A}_{1,2} = \frac{1}{2}(Y_{1,1} - Y_{1,2})$$

may be determined immediately after receiving the signals $Y_{1,1}$ and $Y_{1,2}$ without having to wait for the signals $Y_{1,3}$ and $Y_{1,4}$ in the second time slot. In a similar manner, the virtual variables for the second and third CDM subgroups $\hat{A}_{2,1}$, $\hat{A}_{2,2}$, $\hat{A}_{3,1}$ and $\hat{A}_{3,2}$ may all be determined immediately after receiving the signals $Y_{2,1}$, $Y_{2,2}$, $Y_{3,1}$ and $Y_{3,2}$.

The virtual variables $\hat{A}_{n,3}$ and $\hat{A}_{n,4}$ in equation (4b) can be determined solely based on the signals $Y_{n,3}$ and $Y_{n,4}$ received during the second time slot. In this particular example, the virtual variables for the first, second and third sub-groups $\hat{A}_{1,3}$, $\hat{A}_{1,4}$, $\hat{A}_{2,3}$, $\hat{A}_{2,4}$, $\hat{A}_{3,3}$ and $\hat{A}_{3,4}$ of the second time slot may all be determined immediately after receiving the signals $Y_{1,3}$, $Y_{1,4}$, $Y_{2,3}$, $Y_{2,4}$, $Y_{3,3}$ and $Y_{3,4}$.

In the second step 520, the frequency domain filtering can be performed based on the virtual variables of the time slot to determine virtual channel samples of the time slot as follows.

$$1^{st} \text{ slot } \hat{D}_1 = G \cdot \begin{bmatrix} \hat{A}_{1,1} \\ \hat{A}_{2,1} \\ \hat{A}_{3,1} \end{bmatrix}, \hat{D}_2 = G \cdot \begin{bmatrix} \hat{A}_{1,2} \\ \hat{A}_{2,2} \\ \hat{A}_{3,2} \end{bmatrix} \quad (5a)$$

$$2^{nd} \text{ slot } \hat{D}_3 = G \cdot \begin{bmatrix} \hat{A}_{1,3} \\ \hat{A}_{2,3} \\ \hat{A}_{3,3} \end{bmatrix}, \hat{D}_4 = G \cdot \begin{bmatrix} \hat{A}_{1,4} \\ \hat{A}_{2,4} \\ \hat{A}_{3,4} \end{bmatrix} \quad (5b)$$

Here, each $\hat{D}_i$ represents a 'virtual' channel sample of the i-th layer. The virtual channel samples maybe viewed as an intermediate or temporary variable determined using the OCCs of the CDM subgroups to implement frequency domain filtering. Since the virtual variables $\hat{A}_{n,1}$ and $\hat{A}_{n,2}$ of the first time slot can be determined independently of the virtual variables $\hat{A}_{n,3}$ and $\hat{A}_{n,4}$ of the second time slot for each CDM subgroup, the virtual channel samples $\hat{D}_1$ and $\hat{D}_2$ can be determined independently of the virtual channel samples $\hat{D}_3$ and $\hat{D}_4$. The same 12×3 weighting matrix G as in the conventional scheme may be used. It is seen that unlike the estimated channel coefficients $\hat{W}_{n,i}$ of the conventional method, the virtual channel samples $\hat{D}_i$ can be determined on a slot-by-slot basis.

In the third step 530, time domain filtering or other such post-processing is performed based on the virtual channel samples $\hat{D}_i$ to arrive at the channel estimates $\hat{H}_i$ for each i-th layer.

$$1^{st} \text{ slot } \hat{H}_1 = \frac{\lfloor \hat{D}_1 + \hat{D}_3 \rfloor}{2}, \hat{H}_2 = \frac{\lfloor \hat{D}_1 - \hat{D}_3 \rfloor}{2} \quad (6)$$

$$2^{nd} \text{ slot } \hat{H}_3 = \frac{\lfloor \hat{D}_2 + \hat{D}_4 \rfloor}{2}, \hat{H}_4 = \frac{\lfloor \hat{D}_2 - \hat{D}_4 \rfloor}{2}$$

Regarding the channel estimates $\hat{H}_i$ arrived at through equation (6), it can be shown that they are the same as those arrived through the above-described conventional scheme. This can be seen by expressing $\hat{D}_i$ in terms of $\hat{W}_{n,i}$ by inserting $\hat{A}_{n,i} = \hat{W}_{n,i} + \hat{W}_{n,i+2}$ for i=1 and 2, and $\hat{A}_{n,i} = \hat{W}_{n,i-2} - \hat{W}_{n,i}$ i=3 and 4 into equations (5a) and (5b) and then inserting the obtained expressions for $\hat{D}_i$ into equation (6).

Once the virtual channel samples $\hat{D}_i$ are determined, determining the channel estimates $\hat{H}_i$ is a straightforward arithmetic operation and is significantly less processing intensive. Thus, in one non-limiting embodiment, the frequency domain filtering is performed on a slot-by-slot basis, i.e. the virtual channel samples are determined slot-by-slot. The channel estimates are determined, e.g. time domain filter is applied, after all $Y_{n,j}$ corresponding to the length of the OCC are received.

In another embodiment, the channel estimates $\hat{H}_i$ may also be determined slot-by-slot. For example, channel estimates $\hat{H}_1$ and $\hat{H}_2$ may be determined based on virtual channel samples $\hat{D}_1$ and $\hat{D}_2$ calculated in a current transmission time interval (TTI) and on virtual channel samples $\hat{D}_3$ and $\hat{D}_4$ calculated in a previous TTI. The channel estimates $\hat{H}_3$ and $\hat{H}_4$ would be determined based on virtual channel samples $\hat{D}_1$, $\hat{D}_2$, $\hat{D}_3$ and $\hat{D}_4$ all calculated in the current TTI.

Figure 5:
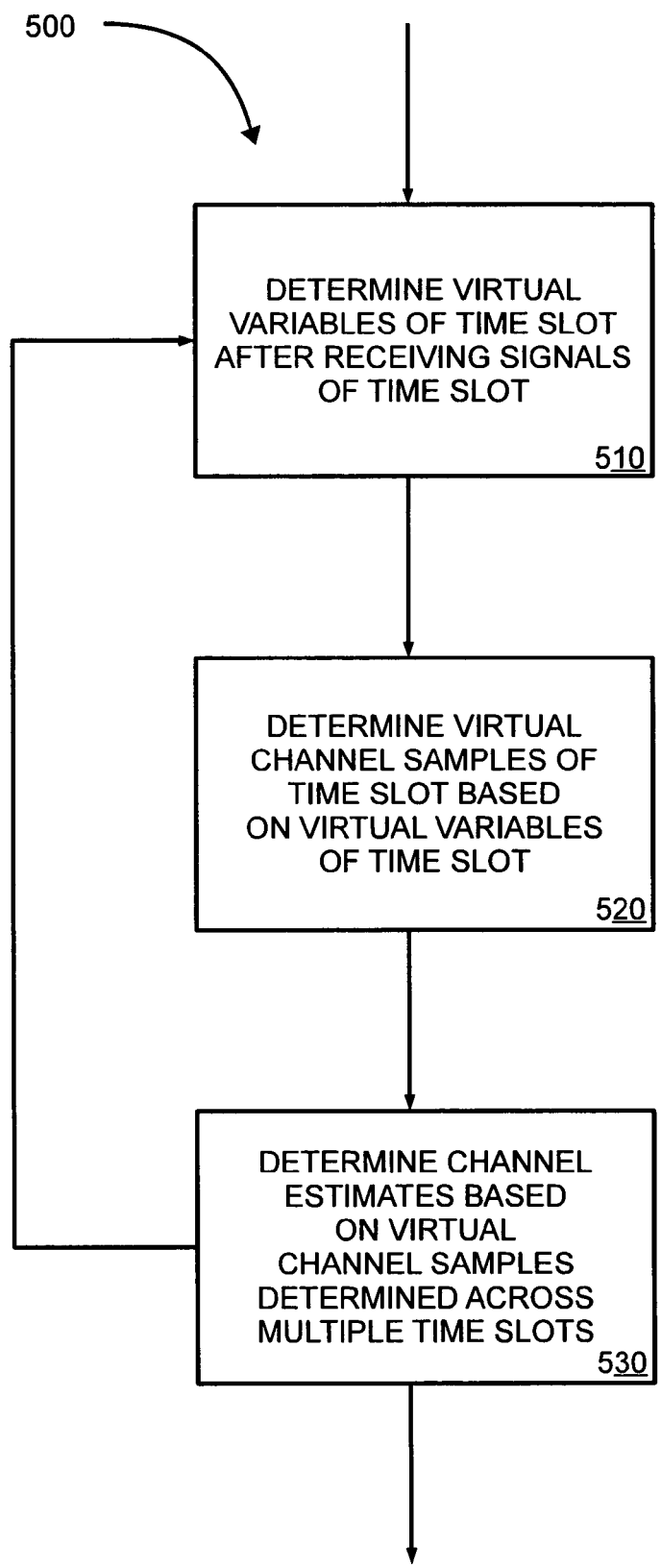
FIG. 5 illustrates an example of a low latency channel estimation method according to a non-limiting aspect of the present invention.

The method illustrated in FIG. 5 may be viewed as a general form of a method performed by a UE for decoding reference signals which are received in a CDM group where the CDM group includes at least two CDM subgroups. A CDM subgroup is a group of REs that share the same subcarrier. Thus, each CDM subgroup is received on a corresponding subcarrier and different CDM subgroups are received on different subcarriers. The reference signals for each CDM subgroup may be carried on resource elements in a first time slot and on resource elements in a subsequent second time slot.

Figure 6:
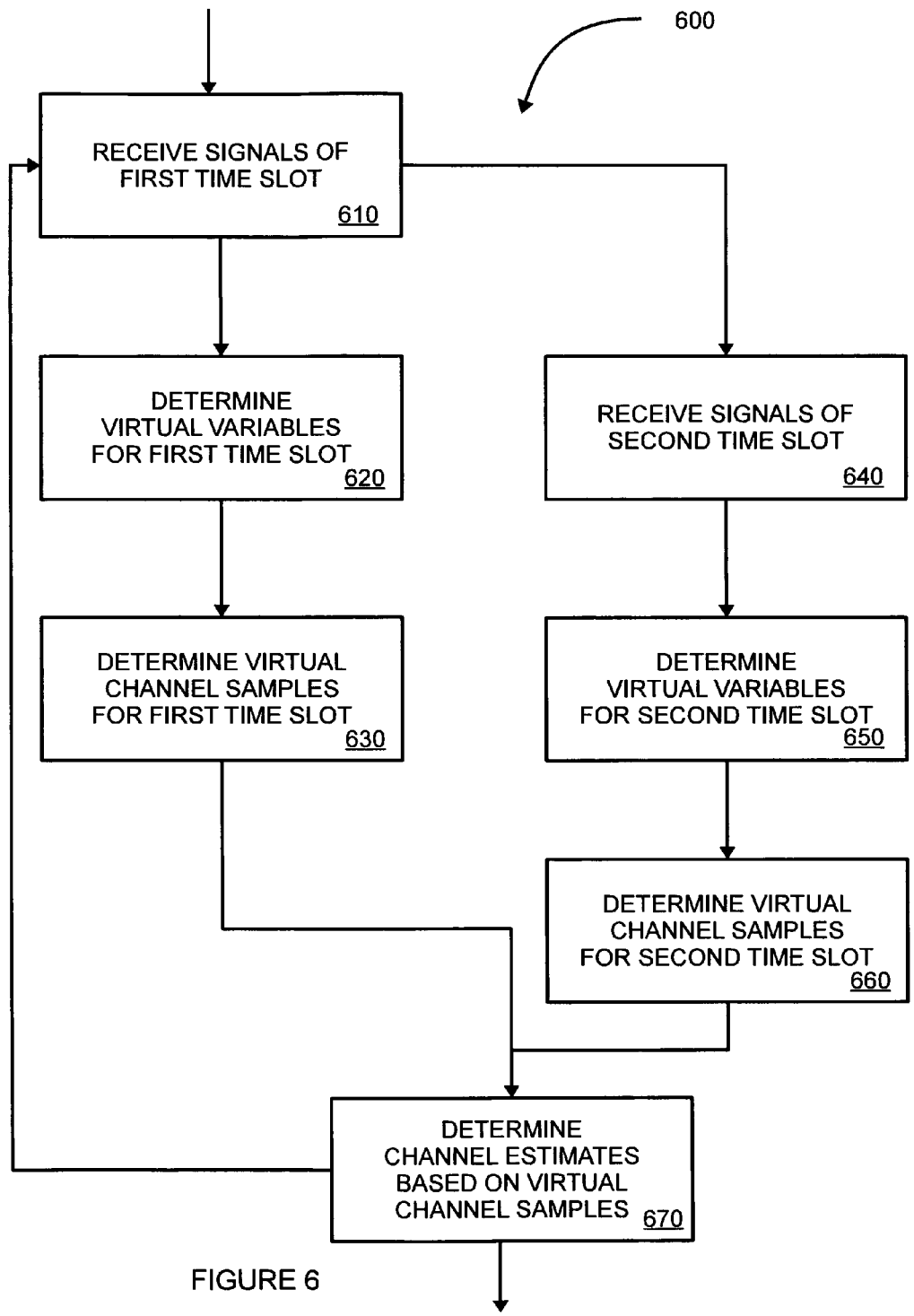
FIG. 6 illustrates another example a low latency channel estimation method according to a non-limiting aspect of the present invention.

A particular non-limiting implementation of the method is illustrated in FIG. 6 as method 600. In step 610, the UE can receive reference signals on a first set of resource elements $Y_{n,j}$, e.g. $Y_{n,1}$ and $Y_{n,2}$, for each CDM subgroup in the first time slot. In step 620, the UE can determine the virtual variables $\hat{A}_{n,i}$ for layers i, i+1, e.g., $\hat{A}_{n,1}$ and $\hat{A}_{n,2}$ in equation (4a), of the first time slot by applying codes of the OCC applicable to the first time slot to the corresponding first set of resource elements $Y_{n,j}$ of each CDM subgroup. The UE can then in step 630 determine the virtual channel samples $\hat{D}_i$ for the layers i, i+1, e.g., $\hat{D}_1$ and $\hat{D}_2$ in equation (5a), of the first time slot by applying a frequency domain filter to the virtual variables of the first time slot. The virtual channel sample $\hat{D}_i = G \cdot \hat{A}_{n,i}$, where G is a predetermined weighting matrix and $\hat{A}_{n,i}$ is a vector of the virtual variables for each CDM subgroup n.

In a similar manner, the UE can receive signals on a second set of resource elements, e.g. $Y_{n,3}$ and $Y_{n,4}$, for each CDM subgroup in the second time slot in step 640, determine the virtual variables, e.g. $\hat{A}_{n,3}$ and $\hat{A}_{n,4}$ in equation (4b), of the second time slot by applying the codes of the OCC applicable to the second time slot to the corresponding second set of resource elements of each CDM subgroup in step 650, and determine the virtual channel samples, e.g., $\hat{D}_3$ and $\hat{D}_4$ in equation (5b), of the second time slot in step 660. While in most instances, the same predetermined weighting matrix G may be used in steps 630 and 660, it is contemplated that different matrices may be used in these steps.

It bears repeating that the virtual variables of the first time slot can be determined independently of the virtual variables of the second time slot. Therefore, in a preferred embodiment, the virtual variables of the first time slot are determined after receiving the signals transmitted in the first time slot irrespective of whether or not the signals transmitted in the second time slot have been received and/or processed. The virtual variables of the second time slot are determined after receiving the signal transmitted in the second time slot. This means that the virtual variables of the first time slot may be determined during the second time slot, or while receiving the signals transmitted in the second time slot as indicated by the parallel paths of performing steps 620 and 640.

The virtual channel samples of the first time slot can also be determined independently of the virtual channel samples of the second time slot. Therefore, in another preferred embodiment, the virtual channel samples of the first time slot are determined after the virtual variables of the first slot are determined irrespective of whether or not the signals transmitted in the second time slot have been received and/or processed. The virtual channel samples of the second time slot are determined after the virtual variables of the second time slot are determined. This means that the virtual channel samples of the first time slot may be determined during the second time slot, or while receiving the signal transmitted in the second time slot as indicated by the parallel paths of steps.

Once the virtual channel samples of both first and second time slots are determined, i.e. when both steps 630 and 660 have completed, the UE can determine the channel estimates, e.g. $\hat{H}_1$, $\hat{H}_2$, $\hat{H}_3$ and $\hat{H}_4$ in equation (6), in step 670. Because the frequency domain filtering of the signals transmitted in the first time slot can begin while receiving the signal transmitted in the second time slot, the proposed example method will allow a shortening of the channel estimation latency. As seen, the steps in FIG. 6, and also in FIG. 5, can be repeated so that continual channel estimation can be performed. In this way, dynamic adaptation to changing conditions and environments is enabled.

With a slight change in equation (6), the Doppler impact can also be reflected by weighting between two CDM clusters, i.e., between the first and second time slots as follows:

$$1^{st}\ slot\ \hat{H}_1 = \frac{\lfloor c_1\hat{D}_1 + c_2\hat{D}_3 \rfloor}{2},\ \hat{H}_2 = \frac{\lfloor c_1\hat{D}_1 - c_2\hat{D}_3 \rfloor}{2} \quad (7)$$

$$2^{nd}\ slot\ \hat{H}_3 = \frac{\lfloor c_1\hat{D}_2 + c_2\hat{D}_4 \rfloor}{2},\ \hat{H}_4 = \frac{\lfloor c_1\hat{D}_2 - c_2\hat{D}_4 \rfloor}{2}$$

In equation (7), $c_1$ and $c_2$ are weighting coefficients determined by the Doppler spread. The coefficients are calculated to reflect realistic channel conditions. In an embodiment, one or more restrictions can be imposed on the weighting coefficients. One restriction condition can be that the weighting coefficients sum should be a constant, e.g., $c_1+c_2=C$. Note that equation (6) can be viewed as a special case of the equation (7) in which $c_1=c_2=1$. Thus a specific condition may be $c_1+c_2=2$, which can be applied to LTE-Advanced case with the length-4 OCC. Another restriction condition that can be imposed is to set the ratio $c_1/c_2$ to be proportional to the amplitude ratio of the second time slot over the first time slot of any RE containing a known signal from the cell of interest and of the same strength or a known strength in the given Transmission Time Interval (TTI) or subframe. This condition allows for a restoration of the orthogonal property of the pilot pattern partly lost due to Doppler fading or Doppler spread. Of course, multiple restriction conditions can be imposed simultaneously.

In the methods 500 and 600 illustrated in FIGS. 5 and 6 and described above, the OCC can be Walsh codes. However, other orthogonal codes can also be used such as a DFT-based orthogonal code.

Figure 7:
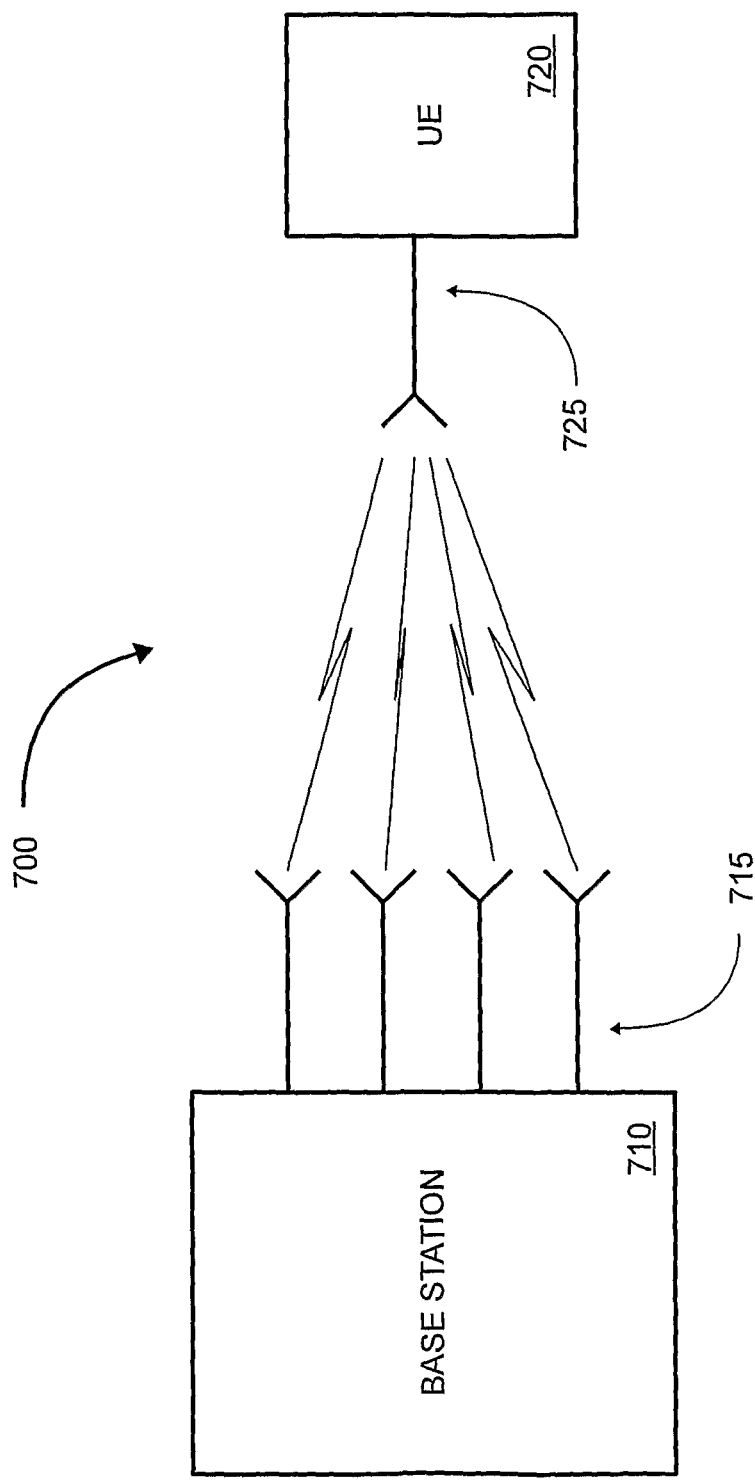
FIG. 7 illustrates a non-limiting embodiment of a wireless communication system in which the low latency channel estimation method may be practiced.

FIG. 7 illustrates a wireless communication system in which the methods described above as well as readily apparent variants thereof may be practiced. The system 700 includes a base station 710 such as an eNodeB and a UE 720. For simplicity and clarity, only one base station 710 and one UE 720 are illustrated. However, it should be noted that multiple base stations and multiple UEs are fully contemplated.

The base station 710 preferably includes a plurality of antenna ports 715, each of which can be used for sending and/or receiving radio signals with the UE 720. While four antenna ports 715 are illustrated, the actual number is not so limited. As mentioned, an antenna port is a logical representation and does not necessarily correspond to a single physical antenna. An antenna port may correspond to one or several physical antennas. Also, each physical antenna may correspond to one or several antenna ports.

The UE 720 also includes at least one antenna port 725 for sending and receiving signals with the base station 710. While only one antenna port 725 is illustrated, the actual number of antenna ports 725 is not so limited.

Figure 8:
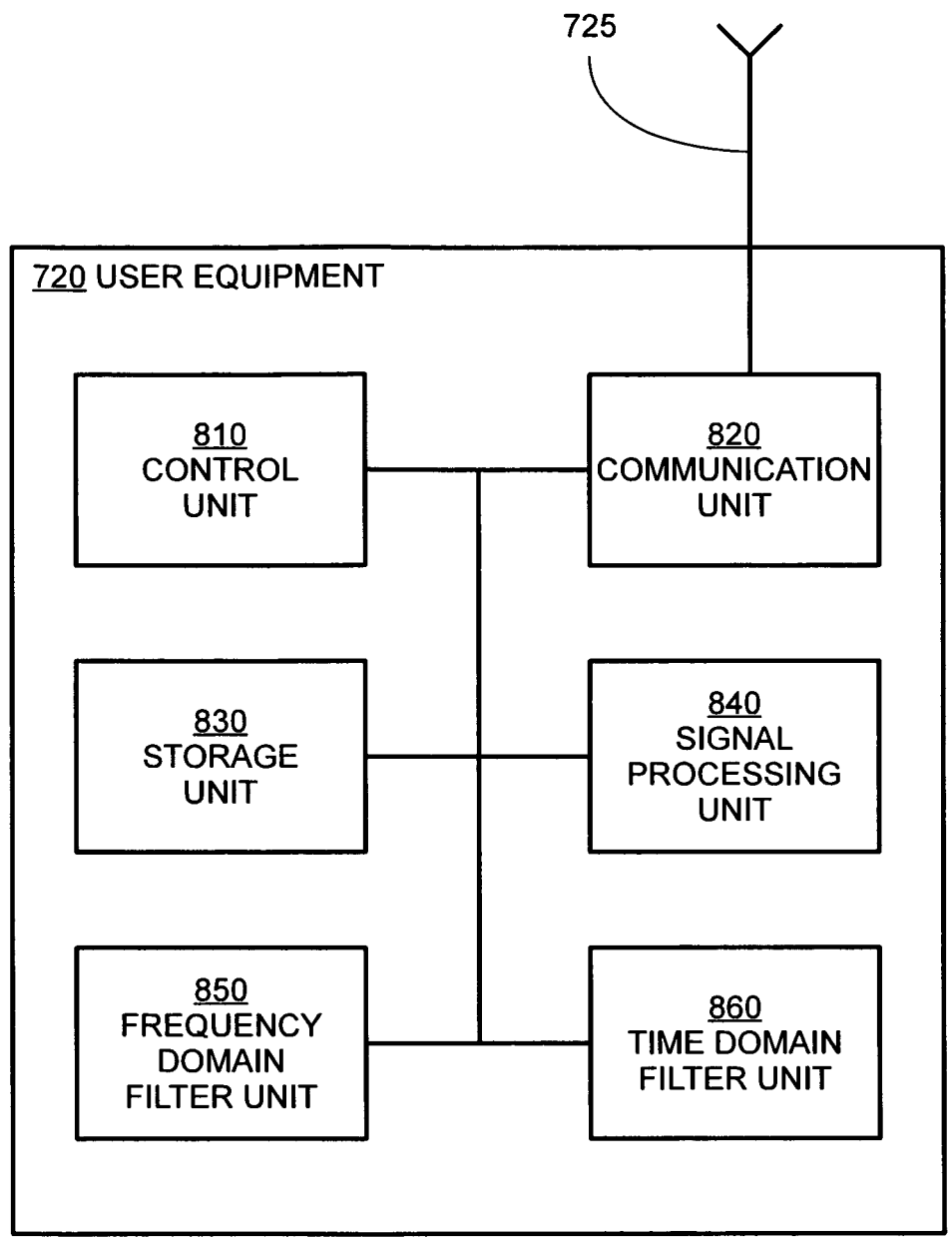
FIG. 8 illustrates a non-limiting embodiment of a UE capable of performing the channel estimation.

Typically, the base station sends the reference signals DM-RS in the specified REs, and the UE performs the channel estimation based on the signals received from the base station as described in relation to the above-described methods. FIG. 8 illustrates an embodiment of a UE capable of performing the channel estimation. The channel estimating capable UE 720 includes, among other things, a control unit 810, a communication unit 820, a storage unit 830, a signal processing unit 840, a frequency domain filter unit 850, and a time domain filter unit 860. The control unit 810 is arranged to control the overall processing of the UE 720 by controlling units 820, 830, 840, 850 and 860 to provide communications services to a user.

The communication unit 820 is arranged to communicate with the base stations of a wireless network, and includes one or more wireless transceivers (not shown) operatively connected to the antenna port(s) 725 for sending and receiving communication signals with the base station.

The storage unit 830 is arranged to store information necessary for operation of the UE 720 and may also store software code that allows other units including the signal processing unit 840, the frequency domain filter unit 850, and the time domain filter unit 860 to operate. The signal processing unit 840 is arranged to determine the virtual variables $\hat{A}_{n,i}$ for each time slot in accordance with step 510 and corresponding equations 4a and 4b. The frequency domain filter unit 850 is arranged to determine the virtual channel samples for each time slot in accordance with step 520 and corresponding equations (5a) and (5b). Further, the time domain filter unit 860 is arranged to determine the channel estimates in accordance with step 530 and equations (6) and (7).

While individual units are illustrated in separate blocks, one or more units may be realized as an integrated unit. For example, the signal processing unit 840, the frequency domain filter unit 850, and the time domain filter unit 860 to may all be combined into a single integrated device. As another example, the storage unit 830 may store therein software codes to implement any one or more of the units 840, 850 and 860 and to be executed by a processing unit or processor of the UE. In general, some or all units may be realized through various combinations of hardware, software, and firmware components. The software components may be stored in the storage unit 830 in a non-transitory form.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed herein. Moreover, it is not necessary for a device or method to address each and every problem described herein or sought to be solved by the present technology, for it to be encompassed herein.

What is claimed is:

1. A method for decoding a reference signal which is received in a code division multiplexing (CDM) group, the CDM group comprising at least two CDM subgroups, each CDM subgroup being received on a different subcarrier, each CDM subgroup comprising resource elements in a first time slot and a second time slot subsequent to the first time slot, the method comprising:
   receiving, at a user equipment, a first set of resource elements for each of the at least two CDM subgroups in the first time slot;
   determining, by the user equipment, virtual variables of the first time slot by applying orthogonal cover codes applicable in the first time slot to the corresponding first set of resource elements of each of the at least two CDM subgroups;
   determining, by the user equipment, virtual channel samples of the first time slot by applying a predetermined weighting matrix to the virtual variables of the first time slot;
   receiving, at the user equipment, a second set of resource elements for each of the at least two CDM subgroups in the second time slot;
   determining, by the user equipment, virtual variables of the second time slot by applying orthogonal cover codes applicable in the second time slot to the corresponding second set of resource elements of each of the at least two CDM subgroups;
   determining, by the user equipment, virtual channel samples of the second time slot by applying the predetermined weighting matrix to the virtual variables of the second time slot; and
   determining, by the user equipment, channel estimates of the at least two CDM subgroups based on the virtual channel samples of both the first and second time slots.

2. The method of claim 1, wherein the virtual variables of the first time slot are determined independently of the virtual variables of the second time slot.

3. The method of claim 1:
   wherein the virtual variables of the first time slot are determined while the second set of resource elements are received in the second time slot;
   wherein the virtual variables of the second time slot are determined after the second set of resource elements are received.

4. The method of claim 1, wherein the virtual channel samples of the first time slot are determined independently of the virtual channel samples of the second time slot.

5. The method of claim 1:
   wherein the virtual channel samples of the first time slot are determined while the second set of resource elements are received in the second time slot;
   wherein the virtual channel samples of the second time slot are determined after the virtual variables of the second time slot are determined.

6. The method of claim 1, wherein in the determining the channel estimates of the at least two CDM subgroups based on the virtual channel samples of both the first and second time slots comprises weighting the virtual channel samples of the first and second time slots.

7. The method of claim 1:
   wherein a length of an orthogonal cover code for each CDM subgroup is 4;
   wherein $Y_{n,1}$ and $Y_{n,2}$ are the first set of resource elements for each of the at least two CDM subgroups n;
   wherein $\hat{A}_{n,1}$ and $\hat{A}_{n,2}$ are the virtual variables of the first time slot determined according to $$\begin{bmatrix} \hat{A}_{n,1} \\ \hat{A}_{n,2} \end{bmatrix} = \begin{bmatrix} Y_{n,1} & Y_{n,2} \\ Y_{n,1} & -Y_{n,2} \end{bmatrix} \cdot \begin{bmatrix} \frac{1}{2} \\ \frac{1}{2} \end{bmatrix};$$

wherein $\hat{D}_1$ and $\hat{D}_2$ are the virtual channel samples of the first time slot determined according to $$\hat{D}_1 = G \cdot \begin{bmatrix} \hat{A}_{1,1} \\ \hat{A}_{2,1} \\ \hat{A}_{3,1} \end{bmatrix}, \hat{D}_2 = G \cdot \begin{bmatrix} \hat{A}_{1,2} \\ \hat{A}_{2,2} \\ \hat{A}_{3,2} \end{bmatrix};$$

wherein G is the predetermined weighting matrix;
   wherein $Y_{n,3}$ and $Y_{n,4}$ are the second set of resource elements for each of the at least two CDM subgroups n;
   wherein $\hat{A}_{n,3}$ and $\hat{A}_{n,3}$ are the virtual variables of the second time slot determined according to $$\begin{bmatrix} \hat{A}_{n,3} \\ \hat{A}_{n,4} \end{bmatrix} = \begin{bmatrix} Y_{n,3} & Y_{n,4} \\ Y_{n,3} & -Y_{n,4} \end{bmatrix} \cdot \begin{bmatrix} \frac{1}{2} \\ \frac{1}{2} \end{bmatrix};$$

wherein $\hat{D}_3$ and $\hat{D}_4$ are the virtual channel samples of the second time slot determined according to and $$\hat{D}_3 = G \cdot \begin{bmatrix} \hat{A}_{1,3} \\ \hat{A}_{2,3} \\ \hat{A}_{3,3} \end{bmatrix}, \hat{D}_4 = G \cdot \begin{bmatrix} \hat{A}_{1,4} \\ \hat{A}_{2,4} \\ \hat{A}_{3,4} \end{bmatrix};$$

wherein $\hat{H}_1$, $\hat{H}_2$, $\hat{H}_3$ and $\hat{H}_4$ are the channel estimates determined according to $\hat{H}_1 = \frac{\lfloor c_1 \hat{D}_1 + c_2 \hat{D}_3 \rfloor}{2}$, $\hat{H}_2 = \frac{\lfloor c_1 \hat{D}_1 - c_2 \hat{D}_3 \rfloor}{2}$, $\hat{H}_3 = \frac{\lfloor c_1 \hat{D}_2 + c_2 \hat{D}_4 \rfloor}{2}$, $\hat{H}_4 = \frac{\lfloor c_1 \hat{D}_2 - c_2 \hat{D}_4 \rfloor}{2}$;

wherein $c_1$ and $c_2$ are weighting coefficients.

8. The method of claim 7:
wherein $\hat{A}_{n,1}$, $\hat{A}_{n,2}$, $\hat{D}_1$ and $\hat{D}_2$ are determined while receiving the second set of resource elements in the second time slot;
wherein $\hat{A}_{n,3}$, $\hat{A}_{n,3}$, $\hat{D}_3$ and $\hat{D}_4$ are determined after receiving the second set of resource elements.

9. The method of claim 7, wherein a sum of $c_1$ and $c_2$ is a predetermined constant and/or a ratio $c_1/c_2$ is set to be proportional to an amplitude ratio of the second time slot over the first time slot of a predetermined resource element containing a known signal from the base station.

10. A user equipment configured to decode a reference signal which is received in a code division multiplexing (CDM) group, the CDM group comprising at least two CDM subgroups, each CDM subgroup being received on a different subcarrier, each CDM subgroup comprising resource elements in a first time slot and a second time slot subsequent to the first time slot, the user equipment comprising:
a communication circuit configured to:
receive a first set of resource elements for each of the at least two CDM subgroups in the first time slot; and
receive a second set of resource elements for each of the at least two CDM subgroups in the second time slot;
a signal processing circuit configured to:
determine virtual variables of the first time slot by applying orthogonal cover codes applicable in the first time slot to the corresponding first set of resource elements of each of the at least two CDM subgroups; and
determine virtual variables of the second time slot by applying orthogonal cover codes applicable in the second time slot to the corresponding second set of resource elements of each of the at least two CDM subgroups;
a frequency domain filter circuit configured to:
determine virtual channel samples of the first time slot by applying a predetermined weighting matrix to the virtual variables of the first time slot; and
determine virtual channel samples of the second time slot by applying the predetermined weighting matrix to the virtual variables of the second time slot;
a time domain filter circuit configured to determine channel estimates of the at least two CDM subgroups based on the virtual channel samples of both the first and second time slots.

11. The user equipment of claim 10, wherein the signal processing circuit is configured to determine the virtual variables of the first time slot independently of the virtual variables of the second time slot.

12. The user equipment of claim 10:
wherein the signal processing circuit is configured to determine the virtual variables of the first time slot while the communication circuit is receiving the second set of resource element in the second time slot;
wherein the signal processing circuit is configured to determine the virtual variables of the second time slot after the communication circuit has received the second set of resource elements.

13. The user equipment of claim 10, wherein the frequency domain filter circuit is configured to determine the virtual channel samples of the first time slot independently of the virtual channel samples of the second time slot.

14. The user equipment of claim 10:
wherein the frequency domain filter circuit is configured to determine the virtual channel samples of the first time slot while the communication circuit is receiving the second set of resource element in the second time slot;
wherein the frequency domain filter circuit is configured to determine the virtual channel samples of the second time slot after the signal processing circuit has determined the virtual variables of the second time slot.

15. The user equipment of claim 10, wherein the time domain filter circuit is configured to determine the channel estimates of the at least two CDM subgroups by weighting the virtual channel samples of the first and second time slots.

16. The user equipment of claim 10:
wherein a length of the OCC code for each CDM subgroup is 4:
wherein $Y_{n,1}$ and $Y_{n,2}$ are the first set of resource elements for each of the at least two CDM subgroups n;
wherein $\hat{A}_{n,1}$ and $\hat{A}_{n,2}$ are the virtual variables of the first time slot determined according to $$\begin{bmatrix} \hat{A}_{n,1} \\ \hat{A}_{n,2} \end{bmatrix} = \begin{bmatrix} Y_{n,1} & Y_{n,2} \\ Y_{n,1} & -Y_{n,2} \end{bmatrix} \cdot \begin{bmatrix} \frac{1}{2} \\ \frac{1}{2} \end{bmatrix};$$

wherein $\hat{D}_1$ and $\hat{D}_2$ are the virtual channel samples of the first time slot determined according to $$\hat{D}_1 = G \cdot \begin{bmatrix} \hat{A}_{1,1} \\ \hat{A}_{2,1} \\ \hat{A}_{3,1} \end{bmatrix}, \hat{D}_2 = G \cdot \begin{bmatrix} \hat{A}_{1,2} \\ \hat{A}_{2,2} \\ \hat{A}_{3,2} \end{bmatrix};$$

wherein G is the predetermined weighting matrix;
wherein $Y_{n,3}$ and $Y_{n,4}$ are the second set of resource elements for each of the at least two CDM subgroups n;
wherein $\hat{A}_{n,3}$ and $\hat{A}_{n,3}$ are the virtual variables of the second time slot determined according to $$\begin{bmatrix} \hat{A}_{n,3} \\ \hat{A}_{n,4} \end{bmatrix} = \begin{bmatrix} Y_{n,3} & Y_{n,4} \\ Y_{n,3} & -Y_{n,4} \end{bmatrix} \cdot \begin{bmatrix} \frac{1}{2} \\ \frac{1}{2} \end{bmatrix};$$

wherein $\hat{D}_3$ and $\hat{D}_4$ are the virtual channel samples of the second time slot determined according to and $$\hat{D}_3 = G \cdot \begin{bmatrix} \hat{A}_{1,3} \\ \hat{A}_{2,3} \\ \hat{A}_{3,3} \end{bmatrix}, \hat{D}_4 = G \cdot \begin{bmatrix} \hat{A}_{1,4} \\ \hat{A}_{2,4} \\ \hat{A}_{3,4} \end{bmatrix};$$

wherein $\hat{H}_1$, $\hat{H}_2$, $\hat{H}_3$ and $\hat{H}_4$ are the channel estimates determined according $$\text{to } \hat{H}_1 = \frac{[c_1\hat{D}_1 + c_2\hat{D}_3]}{2}, \hat{H}_2 = \frac{[c_1\hat{D}_1 - c_2\hat{D}_3]}{2},$$

$$\hat{H}_3 = \frac{[c_1\hat{D}_2 + c_2\hat{D}_4]}{2}, \hat{H}_4 = \frac{[c_1\hat{D}_2 - c_2\hat{D}_4]}{2};$$

wherein $c_1$ and $c_2$ are weighting coefficients.

17. The user equipment of claim 16:
wherein the signal processing circuit and the frequency domain filter circuit are configured to determine $\hat{A}_{n,1}$, $\hat{A}_{n,2}$, $\hat{D}_1$ and $\hat{D}_2$ while the communication circuit is receiving the second set of resource elements in the second time slot;
wherein the signal processing circuit and the frequency domain filter unit circuit are configured to determine $\hat{A}_{n,3}$, $\hat{A}_{n,3}$, $\hat{D}_3$ and $\hat{D}_4$ after the second set of resource elements have been received.

18. The user equipment of claim 16, wherein a sum of $c_1$ and $c_2$ is a predetermined constant and/or a ratio $c_1/c_2$ is set to be proportional to an amplitude ratio of the second time slot over the first time slot of a predetermined resource element containing a known signal from the base station.

* * * * *